United States Patent [19]
Rist

[11] 3,828,883
[45] Aug. 13, 1974

[54] ASSISTED STEERING CONTROL WITH AUTOMATIC RETURN, ESPECIALLY FOR AUTOMOBILE VEHICLES
[75] Inventor: Michel Rist, Boulogne, France
[73] Assignee: Societe Anonyme Francaise Du Ferodo, Paris, France
[22] Filed: June 14, 1973
[21] Appl. No.: 369,908

[30] Foreign Application Priority Data
June 22, 1972  France.............................. 72.22498

[52] U.S. Cl............................... 180/79.2 R, 91/374
[51] Int. Cl............................................... B62d 5/06
[58] Field of Search.......... 180/79.2 R; 91/374, 417, 91/376, 378; 74/388 PS

[56] References Cited
UNITED STATES PATENTS
2,985,146  5/1961  Randol................................ 91/374
3,465,645  9/1969  Mala.................................... 91/376
3,605,932  9/1971  Wilfert et al.................... 180/79.2 R Primary Examiner—Trygve M. Blix
Assistant Examiner—Charles E. Frankfort
Attorney, Agent, or Firm—Young & Thompson

[57] ABSTRACT

An assisted control system for the steering of automotive vehicles, comprises a steering column, a detector responsive to rotation of the column and acting on a toothed rack coupled to the steerable wheels of the vehicle so as to modify the turning angle of the wheels by the movement of the rack, and a double acting hydraulic jack system acting on the rack in either direction. A distribution device actuated by the detector is interposed between the jack system and a controlling source of energy comprising a hydraulic power station. The distribution device comprises an assistance element controlled by the detector and a centering device which brings the assistance element into a mean position of rest, and a restoring element controlled by an operating member responsive to a modification of the turning angle and comprising a reversing device ensuring a reversal of the direction of actuation of the jack system after the return of the assistance element to its position of rest. Both the assistance element and the restoring element of the distribution device comprise gating passages successively interposed between the hydraulic station and the jack system.

11 Claims, 13 Drawing Figures

PATENTED AUG 13 1974 3,828,883

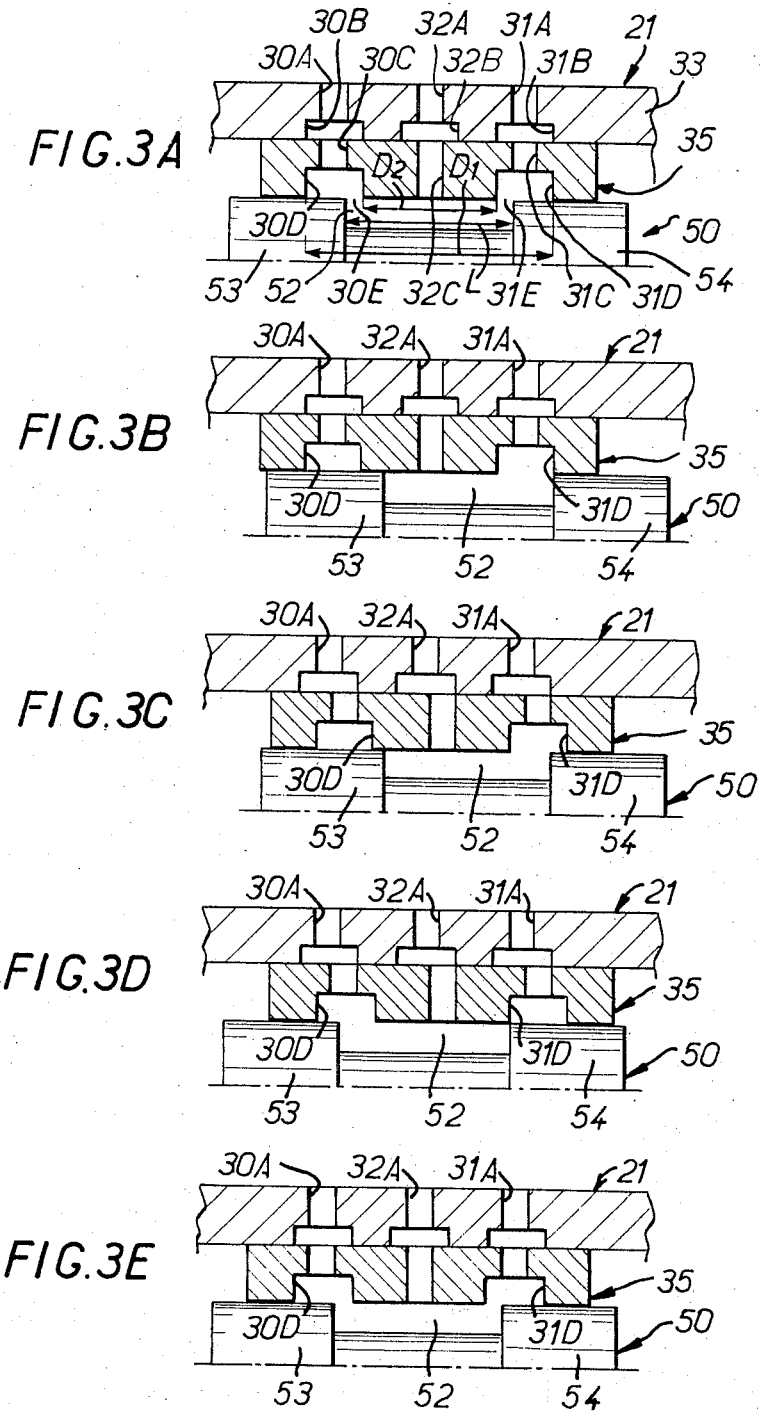

ASSISTED STEERING CONTROL WITH AUTOMATIC RETURN, ESPECIALLY FOR AUTOMOBILE VEHICLES

The present invention relates generally to an assisted steering control, especially for an automobile vehicle, of the kind comprising a rotating actuating column, a toothed rack movably mounted longitudinally and coupled to the steering wheels of the vehicle in such manner as to modify the turning angle of these wheels during its displacement, transmission means established between the said column and the said toothed rack in order to displace the toothed rack and in consequence to modify the turning angle of the said wheels when the said column rotates, detector means responsive to an action on the column for moving the toothed rack, assistance means intended to act on the rack in one direction or in the other, a source of energy adapted to control the said assistance means in one direction or in the other, and a distribution device operated by the said detector means and interposed between the said source of energy and the said assistance means for actuating the latter in one direction or in the other.

The present invention has for its object to provide an assisted steering control of this type with restoring means for systematically returning the steering wheels of the vehicle to the straight-line position when the actuating column which operates them is released, after the application to these wheels of any desired turning angle.

For this purpose and according to the invention, the distribution device interposed between the source of energy and the assistance means comprises two elements, each movably mounted between two extreme positions, a first element known as the assistance element, subjected on the one hand to the detector means and on the other hand to centering means which continuously urge it into the direction of a mean position between its extreme position, known as the position of rest, and a second element known as a restoring element, subjected to an operating member responsive especially to a modification of the turning angle of the wheel, the said restoring element constituting a reversing device capable of ensuring a reversal of the direction of actuation of the assistance means after the return of the mean position of rest of the said assistance element.

In practice, the assistance means are double-acting jack means, the source of energy is a hydraulic power station and the assistance and restoring elements of the distribution device both comprise gating passages successively interposed between the said hydraulic station and the said jack means, and arranged in such manner, in the one hand as not to modify the direction of actuation of the jack means when the assistance element being in one of its extreme positions, the restoring element passes from any position to its extreme position corresponding to that of the said assistance element, and on the other hand to modify the direction of actuation of the jack means between the moment when, the restoring element being in any desired position, the assistance element is moved towards one of its extreme positions, and the moment when, the restoring element being moved towards its extreme position corresponding to that of the assistance element, this latter has returned to its mean position of rest.

Thus, the restoring means according to the invention utilize the same source of energy as the assistance means, and this results in a particularly simple construction for the whole of these means, which advantageously and economically comprise only a limited number of parts.

In practice, the distribution device preferably comprises a slide-valve, a jacket and a casing, a first of these parts being fixed, a second forming the assistance element and the third forming the restoring element.

According to a simplified form of embodiment, the casing is reduced to abutment means.

In practice also, the restoring element is preferably fixed to its operating member, and de-clutchable pawl and ratchet means are provided between this latter and the toothed rack.

This operating member may be responsive only to the turning angle of the wheels and in consequence may control the movement of the restoring element, this movement being preferably limited by stops.

In an alternative form however, this operating member may also be responsive to the speed of the vehicle and/or to the centrifugal force to which this is subjected during turning, for example under the control of a pendulum.

The characteristic features and advantages of the invention will furthermore be brought out in the description which follows below by way of example, reference being made to the accompanying diagrammatic drawing, in which:

FIGS. 3A, 3B, 3C, 3D and 3E are partial views in cross-section illustrating the method of action of this distributor;

Figure 1:
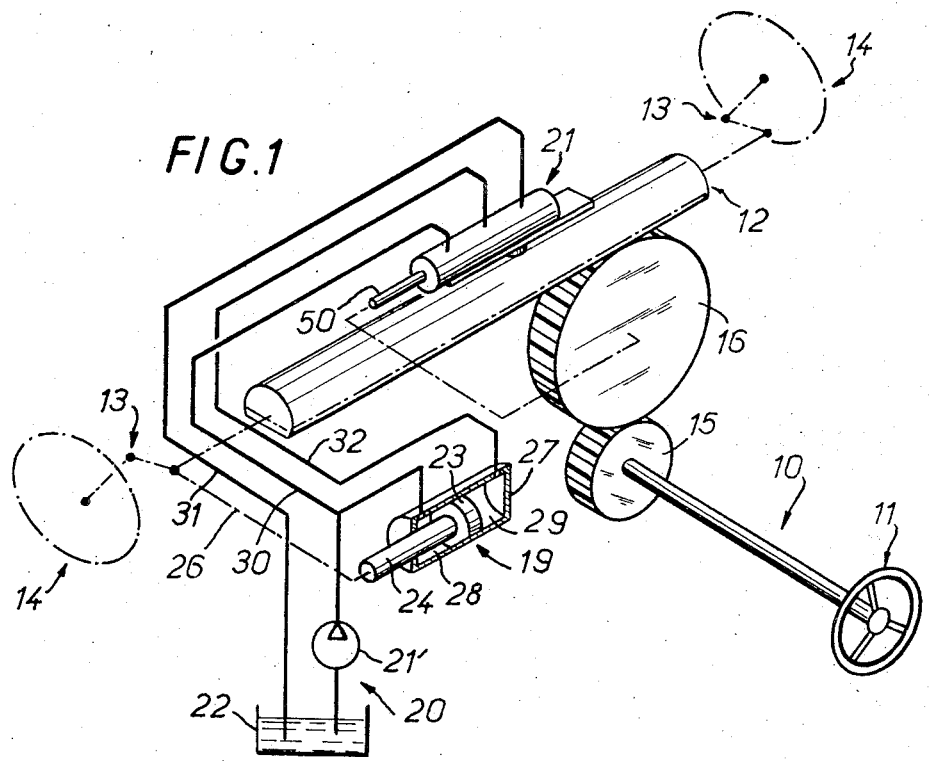
FIG. 1 is a perspective view of a block diagram of an assisted steering system with automatic restoration according to the invention.

In FIG. 1, there has been diagrammatically shown at 10 a rotating actuating column capable of being operated by a steering-wheel 11, and at 12 a toothed-rack slidably mounted longitudinally and coupled by crank-arms 13 to the steering-wheels 14 of an automobile vehicle.

In the example shown, the column 10 is fixed to a pinion 15 which engages with a pinion 16, the latter engaging in its turn with the toothed-rack 12, but any other transmission means and more particularly engagement means may ensure the coupling between the column 10 and the toothed-rack 12.

With the toothed-rack 12 are associated assistance means which in practice comprise double-acting hydraulic jack means supplied from a hydraulic station 20 under the control of a distributor 21.

In the example shown, the hydraulic station 20 comprises a pump 21', the suction of which dips into a tank 22.

In the example shown also, the jack means 19 are constituted by a differential jack comprising a piston 23 which carries a piston-rod 24 acting through a rod system 26 of any kind on the toothed-rack 12, and which divides a jack body 27 into two unequal chambers, a first chamber 28 of small cross-section s formed round the piston rod 24, and a second chamber 29 of large section S.

For example, the section S is twice the section s.

The delivery of the pump 21' is connected through a conduit system 30, on the one hand to the small-section chamber 28 of the jack 19, and on the other hand to one of the extremities of the distributor 21.

The other extremity of this distributor is connected through a conduit system 31 to the tank 22, while its central portion is connected through a conduit 32 to the large-section chamber 29 of the jack 19.

Figure 2:
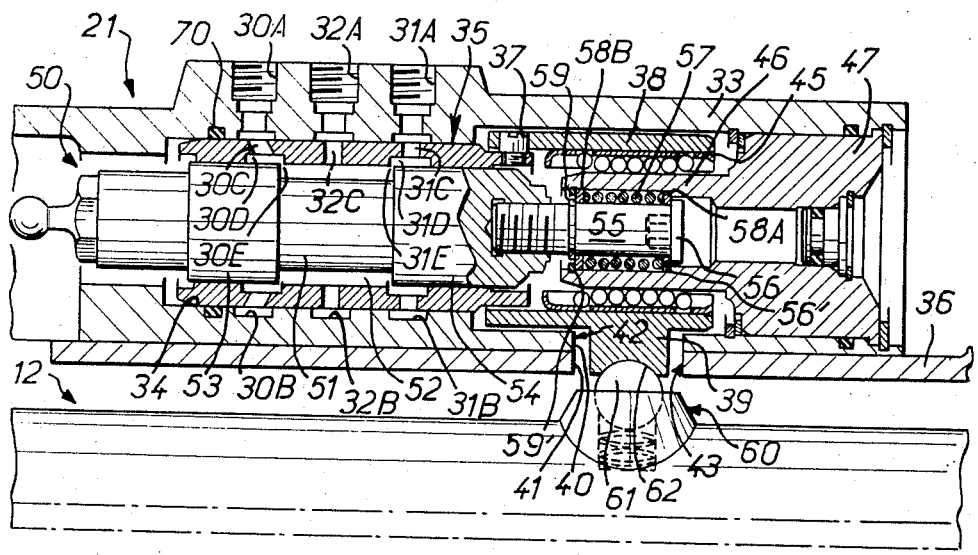
FIG. 2 is a view in axial section of the distribution device utilized in this steering system.
Figure 4A:
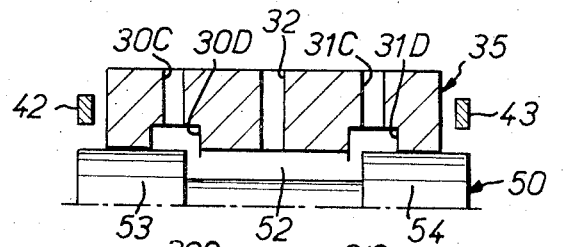
FIGS. 4A, 4B, 4C, 4D and 4E are views respectively similar to FIGS. 3A, 3B, 3C, 3D and 3E and relate to an alternative form of construction.
Figure 4B:
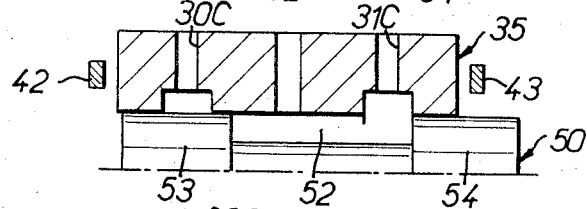
Figure 4C:
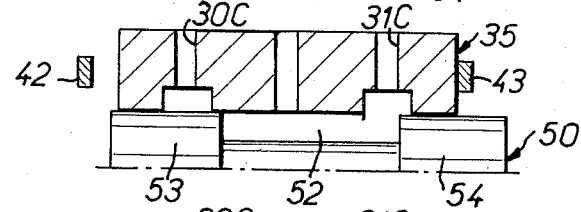
Figure 4D:
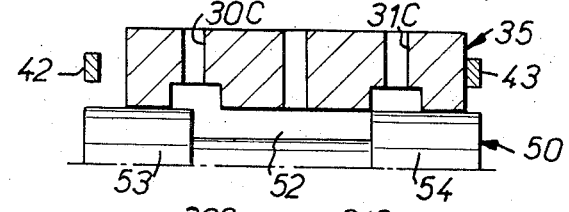
Figure 4E:
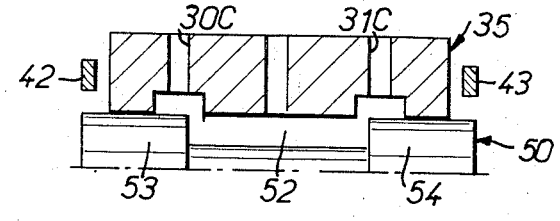

Reference will now be made to FIG. 2, in which the distributor 21 especially is shown to a larger scale.

In the example shown, this distributor 21 comprises a fixed casing 33 carried by a sole-plate 36 and provided with nozzles 30A, 31A and 32A for coupling respectively to the conduits 30, 31 and 32 referred to above.

These nozzles communicate with grooves 30B, 31B and 32B formed in the periphery of the internal bore 34 of the casing 33.

In this internal bore is slidably mounted a first element known as the restoring element, constituted in the example shown by a tubular jacket 35 having radial gating passages 30C, 31C and 32C, in correspondence with the grooves 30B, 31B and 32B of the casing 33, the passages 30C, 31C opening into grooves 30D, 31D at the internal periphery of the jacket 35.

This jacket 35 is fixed at one of its extremities by a screw 37 to an operating member 38 which carries radially a boss 39 passing through openings 40 and 41 formed respectively in the casing 33 and the sole-plate 36 which carries this latter, the transverse edges of these openings being intended to form abutment means 42, 43.

This tubular operating member 38 is guided axially by a ball-bearing housing 45 engaged on a sleeve 46 fixed on an end-piece 47 which closes the corresponding extremity of the casing 33.

In the jacket 35 is slidably mounted a second element known as the assistance element, which in the example shown, is constituted by a slide-valve 50. The latter is provided in its central portion with a zone 51 of smaller diameter, which forms a recess 52 between two bearing surfaces 53 and 54.

At each of its extremities which faces the sleeve 46, the slide-valve 50 carries a tail 55 which is engaged in the said sleeve and which has a radial portion 56 of larger diameter at its extremity.

On this slide-valve tail 55 is engaged a centering spring 57 mounted between two washers 58A, 58B, the first of which is supported on the enlarged portion 56 of the slide-valve tail 55 and against an internal shoulder 56' of the sleeve 46, while the second is supported on two circlips 59, 59' respectively fixed on the slide-valve tail 55 and the sleeve 46.

This spring 57 is thus able to apply pressure continuously to the slide-valve 50 in the direction of a mean position of rest shown in FIG. 2, in which the recess 52 is located facing the gating passage 32C of the jacket 35 and communicates on each side with the grooves 30D and 31D of this jacket, this communication taking place over zones of smaller section 30E and 31E respectively, which are each capable of causing equal pressure losses P.

In a manner known per se, the slide-valve 50 is also coupled to a detector device responsive to an action applied to the column 10 in order to displace the toothed-rack 12. For example, the slide-valve 50 is controlled by the pinion 16, as shown diagrammatically by a broken line in FIG. 1.

In addition, the toothed rack 12 is provided facing the sole-plate 36 which carries the casing 33 of the distributor 21, with a de-clutchable pawl and rachet 60 with a roller 61 capable of co-operating in a releasable manner with a housing 62 formed for that purpose on the boss 39 carried by the operating member 38 which actuates the jacket 35.

In order to understand the operation of the assisted steering with automatic return according to the invention, reference will now be made to the diagrammatic drawings of FIGS. 3A, 3B, 3C, 3D and 3E.

In these drawings, there is again seen at 33 the casing of the distributor 21, with its nozzles 30A, 31A and 32A and its grooves 30B, 31B and 32B, at 35 the sliding restoring jacket with its passages 30C, 31C and 32C and its grooves 30D, 31D, and at 50 the slide-valve with the central recess 52 and the pressure-loss passages 30E, 31E, which it forms.

In FIG. 3A it has been assumed that the whole of the movable members employed was in a central position of rest, the steering-wheels of the vehicle concerned being in the straight position.

In this case, the boss 39 of the actuating member 38 which operates the jacket 35 is at equal distances from the associated abutments 42, 43 and the roller 61 of the ratchet 60 carried by the toothed-rack 12 is engaged in the housing 62 provided on the boss 39.

The delivery of the pump 21' is in communication with the tank 22, successively by the conduit 30, the passages and grooves 30A, 30B, 30C, 30D and 30E, the recess 52, the passages and grooves 31E, 31D, 31C, 31B and 31A, and the conduit 31, so that the pressure $Ps$ at the outlet of the pump is governed by the pressure losses generated by the passages 30E and 31E. This pressure $Ps$ is therefore equal as a whole to twice the pressure loss P caused individually by each of these passages.

This pressure $Ps$ is furthermore applied through the conduit 30 to the small section chamber 28 of the jack 19.

At the same time, the delivery of the pump 21' is in communication with the large-section chamber 29 of the jack 19, successively by the conduit 30, the passages and grooves 31A, 31B, 31C, 31D and 31E, the recess 52, the passages and grooves 32C, 32B, 32A and the conduit 32, so that the pressure in this chamber 29 is governed only by the pressure losses generated by the passage 30E.

The pressure obtained in the chamber 29 of the jack 19 is therefore equal to half the pressure $Ps$ existing in the small-section chamber 28 of this jack; the chamber 29 having a section twice that of the chamber 28, the jack 19 is in a position of rest.

It will be assumed that action is now applied on the actuating column 10 in a direction causing for example the toothed-rack 12 to slide towards the right.

Due to the fact that the slide-valve 50 of the distributor 21 is controlled by a detector responsive to an action on the column, it moves towards the right in the direction of its corresponding extreme position, against the action of its restoring spring 57 (FIG. 3B).

Upon completion of this movement towards the right, the slide-valve 50 completely closes the groove 30D of the jacket 35 by its bearing surface 53, and on the contrary completely frees the groove 31D of this jacket.

From that time on, all communication is interrupted between the pump 21' and the large-section chamber 29 of the jack 19, while on the contrary, on the one hand this chamber is put into communication with the tank 22, successively through the conduit 32, the passages and grooves 32A, 32B and 32C, the recess 52, the passages and grooves 31D, 31C, 31B and 31A and the conduit 31, and on the other hand the small-section chamber 28 of the jack 19 remains subjected, through the conduit 30, to the pressure delivered by the pump 21'.

In consequence, the piston of the jack 19 moves towards the right and assists the toothed-rack 12 in its movement.

By reason of the pawl and ratchet 60 which it carries, the toothed-rack 12 drives the operating member 38 and therefore the jacket 35 until contact is made by the boss 39 of this operating member 38 against the abutment 43 provided for that purpose.

The toothed-rack 12 continuing its movement, the roller 61 escapes from the housing 62 formed in the boss 39 of the operating member 38 and rolls on the sole-plate 36 which carries the casing 33 of the distributor 21.

At the end of its displacement, the jacket 35 occupies the end abutment position illustrated in FIG. 3C.

It should be noted that for this extreme position of abutment, the gating passages do not modify the direction of actuation of the jack means.

In other words, the gating passages are arranged in such manner as not to modify the direction of actuation of the jack 19 when the slide-valve 50 or assistance element being in one of its end positions, the jacket 35 or restoring element passes from its mean position of rest to an extreme position corresponding to that of the assistance element.

For that purpose, it is only necessary that the movement of the restoring element between its abutments should be less than the corresponding maximum movement of the assistance element, that the grooves of the casing 33 are sufficiently dimensioned for the displacement of the jacket not to cause any interruption of communications between the casing 33 and the jacket 35, and that the axial length L of the recess 52 is comprised between the distance $D_1$ separating the extreme transverse edges of the grooves 30D, 31D which are farthest away from each other and the distance $D_2$ separating the extreme transverse edges of these grooves which are closest to each other (see FIG. 3A).

When the action on the column 10 which has caused the movement of the toothed-rack 12 is released, the slidevalve 50 is liberated by the detector responsive to such an action, and under the effect of its restoring spring 57 it returns to its means position of rest, while the jacket 35 remains in its extreme abutment position (FIG. 3D) by virtue of a friction joint 70.

From that time on, the slide-valve 50 completely closes the groove 31D of the jacket 35 by its bearing surface 54, while it largely frees the groove 30D of the said jacket.

In consequence, the communication by the conduit 31 of the large-section chamber 29 of the jack 19 with the tank 22 is interrupted, while on the contrary, this chamber is connected without loss of pressure to the delivery of the pump 21', successively through the conduit 30, the passages and grooves 30A, 30B, 30C and 30D, the recess 52, the passages and grooves 32C, 32B and 32A, and the conduit 32.

The delivery pressure of the pump 21' is thus applied on the two faces of the piston 23 of the jack 19, but as the section of the chamber 29 of this jack is twice that of the chamber 28, this piston thus moves towards the left.

In consequence, the toothed-rack 12 which is controlled by this piston, it also moved towards the left, and during the course of this return or restoring movement, the roller 61 again comes into engagement with the boss 39 of the operating member 38 of the jacket 35, which ensures the return of this jacket towards the left.

Thus, the gating passages interposed between the pump 21' and the assistance jack 19 are arranged in such manner as to modify the direction of actuation of this jack between the moment when the restoring element 35 of the distributor 21 being in any particular position, the assistance element 50 of this latter is moved towards one of its extreme positions, and the moment when, the restoring element being moved towards its extreme position corresponding to that of the assistance element, this latter has returned to its mean position of rest.

This return movement continues until the jacket or restoring element 35 being again in the mean position of rest, equal forces are applied on the two faces of the piston 23 of the jack 19, as previously described.

According to the alternative form of embodiment shown diagrammatically in FIGS. 4A, 4B, 4C, 4D and 4E, the casing 33 is reduced to the abutments 42, 43 which limit the travel of the jacket 35.

In the preceding description, it has been assumed that the hydraulic jack means utilized for assisting the steering are constituted by a differential jack.

Figure 5:
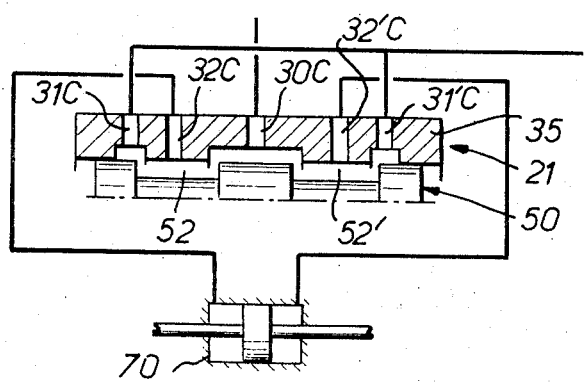
FIG. 5 is a view similar to FIG. 3A and relates to another alternative form of construction.

As shown diagrammatically in FIG. 5, these jack means could be constituted by a symmetrical jack 70.

In this case, it would be suitable for the distributor 21 to comprise four ways instead of three, the slide-valve 50 forming two recesses 52 and 52' capable of putting passages formed in the associated jacket 35 into communication, two by two.

These passages are five in number, namely a central passage 30C connected to the delivery of the pump, two end passages 31C and 31'C connected to the tank 22, and intermediate passages 32C and 32'C, each connected respectively to the two extremities of the jack 70.

It will be understood that the present invention is not limited to the forms of construction described and shown, but includes all alternative forms of execution.

In particular, according to an alternative form (not shown), the restoring member is a slidably-mounted jacket moving on the one hand in a casing which is itself movably-mounted axially and which forms the assistance member, and on the other hand on a slide-valve which is fixed.

Furthermore, the control of this jacket could equally well be effected hydraulically rather than by a releasable pawl and ratchet system, and it may be under the control of an operating member responsive not only to the turning angle given to the wheels of the vehicle, but also to other factors, for example to the speed of the vehicle and to the radius of the turning circle, under the control for example of a pendulum.

It is furthermore obvious that inversion means may be provided between the toothed-rack 12 and the jacket 35 in the case where, for the same effect, the latter are required to move in the opposite direction.

Finally, instead of a linear construction, the distributor 21 according to the invention may give rise to a circular construction, the restoring member being for example a tubular shell rotatably mounted on a central core which is itself rotatable.

What I claim is:

1. An assisted steering control system for an automobile vehicle, of the kind comprising a rotatable actuating column, a toothed-rack movably-mounted longitudinally and coupled to the steering wheels of said vehicle in such manner as to modify the turning angle of said wheels during the movement of said rack, transmission means provided between said column and said toothed-rack in order to move said rack and in consequence to modify the turning angle of said vehicle wheels when said actuating column is rotated, detector means responsive to action on said column for moving said toothed-rack, assistance means adapted to act on said rack in one direction or the other, a source of energy adapted to control said assistance means in one direction or the other, and a distribution device actuated by said detector means and interposed between said source of energy and said assistance means, for actuating said means in one direction or the other, in which said distribution device comprises two elements, each element being movably mounted between two extreme positions, a first element or assistance element controlled on the one hand by said detector means and on the other hand by centering means which continuously urge said assistance element into the direction of a mean position between its extreme positions, known as the position of rest, and a second element or restoring element, controlled by an operating member especially responsive to a modification of the turning angle of said wheels, said restoring element constituting a reversing device adapted to ensure a reversal of the direction of actuation of said assistance means, after the return of said assistance element to the position of rest.

2. An assisted steering system as claimed in claim 1, in which said assistance means comprise double-acting hydraulic jack means, said source of energy is a hydraulic station, and the assistance and restoring elements for said distribution device both comprise gating passages successively interposed between said hydraulic station and said jack means and arranged in such manner as not to modify the direction of actuation of said jack means when, the assistance element being in one of its extreme positions, the restoring element passes from a mean position of rest to its extreme position corresponding to that of said assistance element, and on the other hand so as to modify the direction of actuation of said jack means between the moment when, the restoring element being in any position, the assistance element is moved towards one of its extreme positions and the moment when, the restoring element being moved towards its extreme position which corresponds to that of the assistance element, said latter element has returned to its mean position of rest.

3. An assisted steering system as claimed in claim 1, in which said assistance element and said restoring element are movable independently of each other.

4. An assisted steering system as claimed in claim 1, in which said restoring element is a jacket slidably-mounted on a slide-valve which is in turn movable axially and which constitutes said assistance element.

5. An assisted steering system as claimed in claim 2, in which said restoring element is a jacket slidably-mounted, on the one hand in a casing which is itself axially movable, and on the other hand on a slide-valve which forms said assistance element.

6. An assistance steering system as claimed in claim 4, in which said jacket which constitutes the restoring element is slidably mounted inside a fixed casing.

7. An assisted steering system as claimed in claim 5, in which said restoring element comprises a plurality of transverse gating passages adapted to be put into communication two by two under the control of at least one gating recess formed for that purpose in said assistance element.

8. An assisted steering system as claimed in claim 7, in which the travel of said restoring element between its extreme positions is less than the corresponding maximum travel of said assistance element, and the axial length of the gating recess of said assistance element is comprised between the distance separating the transverse edges of the gating passages of said restoring element which are farthest away from each other, and the distance separating the edges of said gating passages which are closest together.

9. An assisted steering system as claimed in claim 1, in which said restoring element is fixed to its operating member, and further comprising releasable pawl and ratchet means provided between said operating member and said toothed rack.

10. An assisted steering system as claimed in claim 1, in which said restoring element is operated by hydraulic means.

11. An assisted steering system as claimed in claim 1, in which said restoring element is controlled by an actuating member responsive to the turning angle impressed on said vehicle wheels.

* * * * *